United States Patent
Choi et al.

(10) Patent No.: US 12,489,812 B2
(45) Date of Patent: Dec. 2, 2025

(54) SCALABLE MEMORY POOL

(71) Applicant: Samsung Electronics Co., Ltd., Suwon-si (KR)

(72) Inventors: Byung Hee Choi, Fremont, CA (US); Divya Kiran Kadiyala, Atlanta, GA (US); Changho Choi, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 18/152,076

(22) Filed: Jan. 9, 2023

(65) Prior Publication Data

US 2024/0146805 A1 May 2, 2024

Related U.S. Application Data

(60) Provisional application No. 63/419,643, filed on Oct. 26, 2022.

(51) Int. Cl.
*H04L 67/1097* (2022.01)
*G06F 13/16* (2006.01)
*H04L 47/70* (2022.01)

(52) U.S. Cl.
CPC ...... *H04L 67/1097* (2013.01); *G06F 13/1668* (2013.01); *H04L 47/70* (2013.01)

(58) Field of Classification Search
CPC .. H04L 67/1097; H04L 47/70; G06F 13/1668
USPC ........................................................ 709/250
See application file for complete search history.

(56) References Cited

U.S. PATENT DOCUMENTS

| | | | |
|---|---|---|---|
| 5,539,696 | A | 7/1996 | Patel |
| 5,909,701 | A | 6/1999 | Jeddeloh |
| 5,926,838 | A | 7/1999 | Jeddeloh |
| 5,961,596 | A | 10/1999 | Takubo et al. |
| 6,078,623 | A | 6/2000 | Isobe et al. |
| 7,208,988 | B2 | 4/2007 | Murata et al. |
| 8,798,032 | B2 | 8/2014 | Tirkkonen et al. |

(Continued)

FOREIGN PATENT DOCUMENTS

| | | |
|---|---|---|
| CN | 112737724 B | 9/2022 |
| CN | 117827548 A | 4/2024 |

(Continued)

OTHER PUBLICATIONS

Wikipedia, Torus Interconnect, Jun. 23, 2022, 5 pages (Year: 2022).*

(Continued)

*Primary Examiner* — Wing F Chan
*Assistant Examiner* — Leon Y Tseng
(74) *Attorney, Agent, or Firm* — Lewis Roca Rothgerber Christie LLP

(57) ABSTRACT

A system including a scalable memory pool. In some embodiments, the system includes: a first memory node, including a first memory; a second memory node, including a second memory; and a memory node switching fabric connected to the first memory node and the second memory node, the memory node switching fabric being configured to provide access, via the first memory node: with a first latency, to the first memory, and with a second latency, greater than the first latency, to the second memory.

15 Claims, 12 Drawing Sheets

(56) References Cited

U.S. PATENT DOCUMENTS

| | | | |
|---|---|---|---|
| 9,261,897 | B2 | 2/2016 | Kim et al. |
| 9,319,030 | B2 | 4/2016 | Gentner et al. |
| 9,940,287 | B2 | 4/2018 | Das Sharma |
| 10,254,987 | B2 | 4/2019 | Shrader et al. |
| 10,372,647 | B2 | 8/2019 | Lovett et al. |
| 11,025,544 | B2 | 6/2021 | Marolia et al. |
| 11,070,304 | B1 | 7/2021 | Levi et al. |
| 11,206,625 | B2 | 12/2021 | Kwon et al. |
| 11,461,263 | B2 | 10/2022 | Malladi et al. |
| 11,853,215 | B2 | 12/2023 | Jeong et al. |
| 2003/0137997 | A1 | 7/2003 | Keating |
| 2003/0208631 | A1* | 11/2003 | Matters ................... H04L 67/63 709/250 |
| 2004/0085108 | A1 | 5/2004 | Murata et al. |
| 2006/0090163 | A1 | 4/2006 | Karisson et al. |
| 2009/0217280 | A1 | 8/2009 | Miller et al. |
| 2012/0069836 | A1 | 3/2012 | Tirkkonen et al. |
| 2014/0250260 | A1 | 9/2014 | Yap |
| 2014/0348181 | A1 | 11/2014 | Chandra et al. |
| 2018/0189188 | A1* | 7/2018 | Kumar ..................... G06F 3/067 |
| 2020/0125503 | A1* | 4/2020 | Graniello ............ G06F 15/7807 |
| 2020/0371692 | A1 | 11/2020 | Van Doorn et al. |
| 2021/0109879 | A1 | 4/2021 | Sharma |
| 2021/0117360 | A1* | 4/2021 | Kutch ................. G06F 13/4027 |
| 2021/0149680 | A1 | 5/2021 | Hughes et al. |
| 2021/0150663 | A1 | 5/2021 | Maiyuran et al. |
| 2021/0150770 | A1 | 5/2021 | Appu |
| 2021/0263779 | A1 | 8/2021 | Haghighat et al. |
| 2021/0266253 | A1 | 8/2021 | He et al. |
| 2021/0274419 | A1 | 9/2021 | Lin et al. |
| 2021/0311646 | A1 | 10/2021 | Malladi et al. |
| 2021/0318961 | A1* | 10/2021 | Peterson ............. G06F 12/0804 |
| 2021/0373951 | A1 | 12/2021 | Malladi et al. |
| 2022/0004330 | A1 | 1/2022 | Bernat et al. |
| 2022/0066827 | A1 | 3/2022 | Tavallaei et al. |
| 2022/0066928 | A1 | 3/2022 | Tavallaei et al. |
| 2022/0066935 | A1 | 3/2022 | Tavallaei et al. |
| 2022/0075520 | A1 | 3/2022 | Tavallaei et al. |
| 2023/0086149 | A1 | 3/2023 | Kuo et al. |
| 2023/0092541 | A1* | 3/2023 | Dugast ................ G06F 12/0813 711/154 |
| 2024/0045823 | A1 | 2/2024 | Malladi et al. |
| 2024/0085943 | A1 | 3/2024 | Van Oven et al. |
| 2024/0111680 | A1 | 4/2024 | Branover |
| 2024/0116541 | A1 | 4/2024 | Hong |
| 2024/0146805 | A1 | 5/2024 | Choi et al. |

FOREIGN PATENT DOCUMENTS

| | | |
|---|---|---|
| JP | 2010-009628 A | 1/2010 |
| WO | 2015089054 A1 | 6/2015 |
| WO | WO 2022/083537 A1 | 4/2022 |
| WO | WO 2022/221466 A1 | 10/2022 |

OTHER PUBLICATIONS

Li, CXL-Based Memory Pooling Systems for Cloud Platforms, Oct. 21, 2022, 17 pages (Year: 2022).*

Lee, S-s. et al., "MIND: In-Network Memory Management for Disaggregated Data Centers", SOSP '21, Oct. 26-29, 2021, Virtual Event, Germany, pp. 488-504, Association for Computing Machinery.

Li, H. et al., "First-generation Memory Disaggregation for Cloud Platforms", arXiv:2203.00241v2, Mar. 5, 2022, pp. 1-4.

Shan, Y. et al., "Towards a Fully Disaggregated and Programmable Data Center", APSys '22, Aug. 23-24, 2022, Virtual Event, Singapore, 11 pages.

European Search Report for EP 23202709.4 dated Feb. 28, 2024, 9 pages.

Montaner, et al. "Getting Rid of Coherency Overhead for Memory-Hungry Applications," 2010 IEEE International Conference on Cluster Computing, 2010, pp. 48-57.

Ogleari, et al. "String Figure: A Scalable and Elastic Memory Network Architecture," 2019 IEEE International Symposium on High Performance Computer Architecture (HPCA), 2019, pp. 647-660.

Shantharama, et al. "Hardware-Accelerated Platforms and Infrastructures for Network Functions: A Survey of Enabling Technologies and Research Studies," IEEE, vol. 8, 2020, pp. 132021-132085.

Vaquero, et al. "Disaggregated Memory at the Edge," EdgeSys '21, Apr. 26, 2021, 6 pages.

Zahka, et al. "FAM-Graph: Graph Analytics on Disaggregated Memory," 2022 IEEE International Parallel and Distributed Processing Symposium (IPDPS), 2022, pp. 81-92.

Machine translation of JP 2010-009628 (Year: 2010).

Shrivastav, Vishal, et al., "Globally Synchronized Time via Datacenter Networks," IEEE/ACM Transactions of Networking, vol. 27, No. 4, Aug. 2019, pp. 1401-1416.

Putnam, Andrew, et al., "A Reconfigurable Fabric for Accelerating Large-Scale Datacenter Services," IEEE, Jul. 2014, 12 pages.

EPO Extended European Search Report dated Jan. 23, 2024, issued in European Patent Application No. 23189201.9 (7 pages).

US Office Action dated Jun. 17, 2024, issued in U.S. Appl. No. 18/211,131 (40 pages).

US Final Office Action dated Oct. 9, 2024, issued in U.S. Appl. No. 18/211,131 (32 pages).

Bit and Frame Synchronization Techniques; Probst et al.; Jan. 27, 2018; retrieved from https://web.archive.org/web/20180127171033/https://www4.comp.polyu.edu.hk/-comp2322/Bit%20and%20Frame%20Synchronization%20Techiques.pdf (Year: 2018).

US Advisory Action dated Jan. 14, 2025, issued in U.S. Appl. No. 18/211,131 (4 pages).

K.S. Yildirim, R. Carli and L. Schenato, "Adaptive Proportional-Integral Clock Synchronization in Wireless Sensor Networks," in IEEE Transactions on Control Systems Technology, vol. 26, No. 2, pp. 610-623, Mar. 2018, doi: 10.1109/TCST.2017.2692720. (Year: 2018).

US Notice of Allowance dated Jun. 27, 2025, issued in U.S. Appl. No. 18/211,131 (10 pages).

* cited by examiner

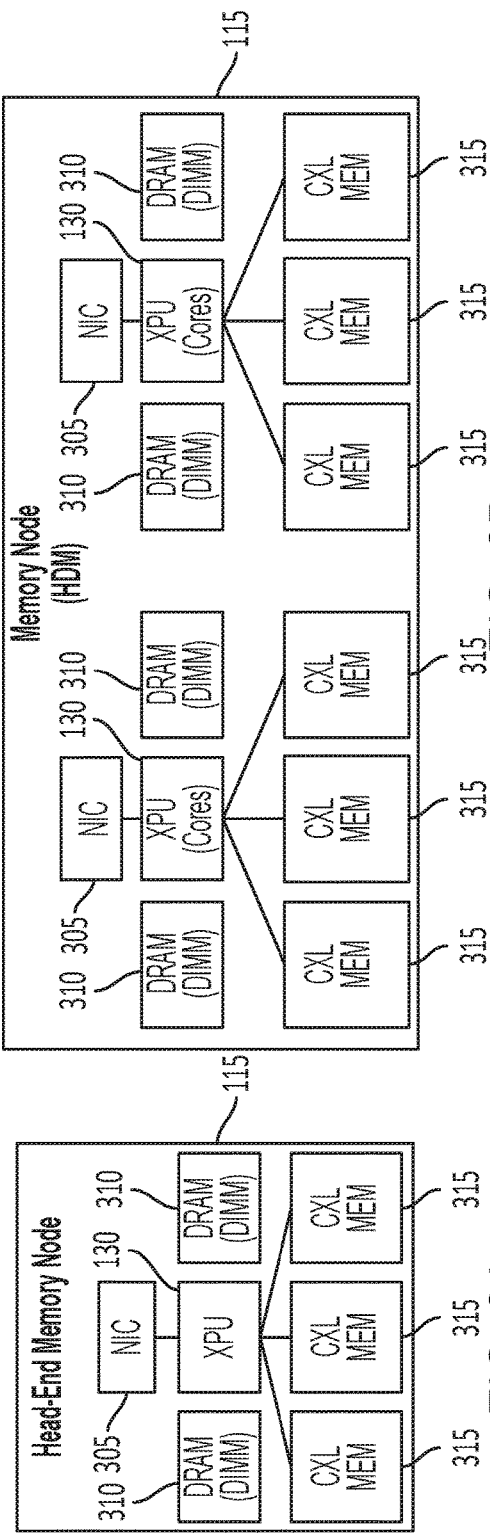
FIG. 3A
FIG. 3B
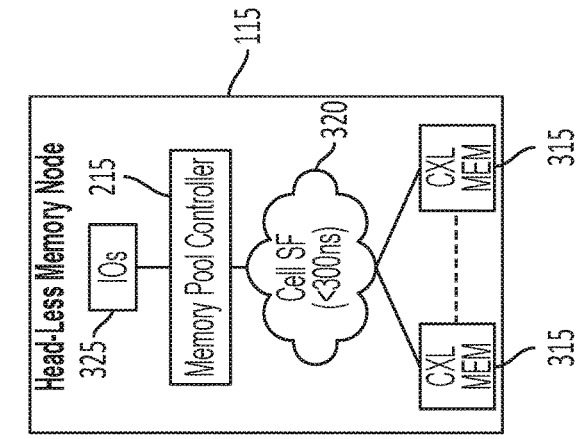
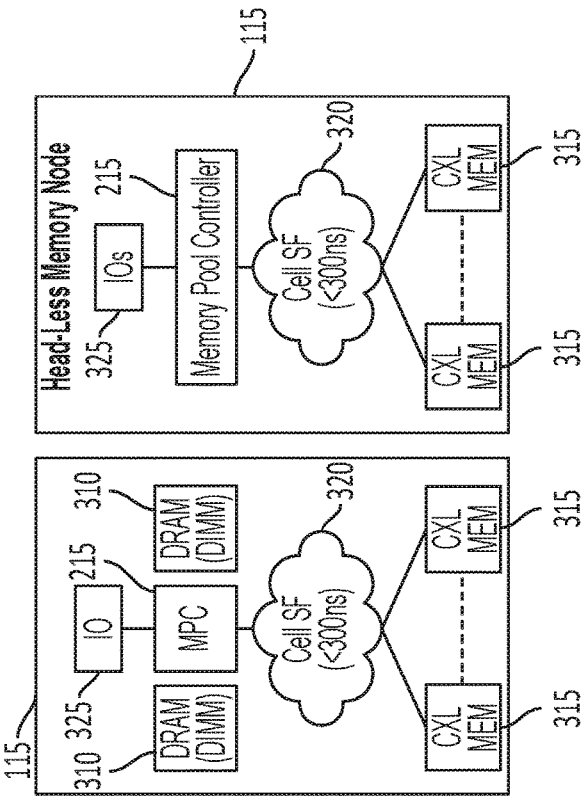
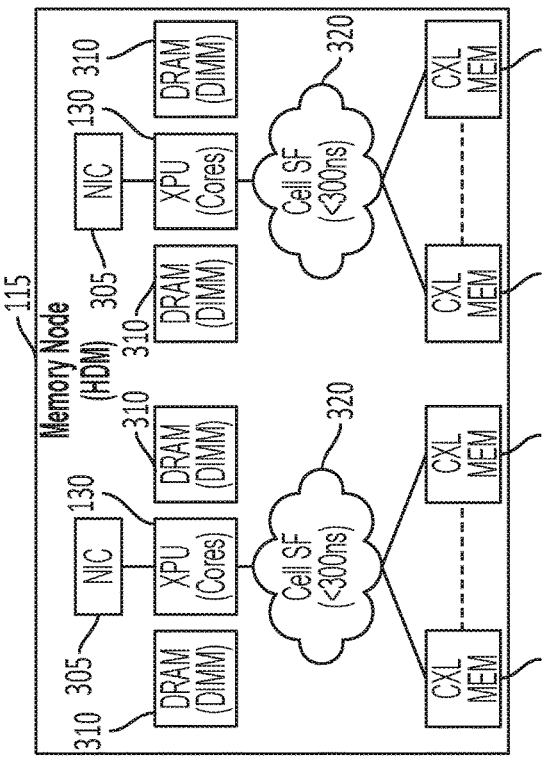
FIG. 3C
FIG. 3D
FIG. 3E

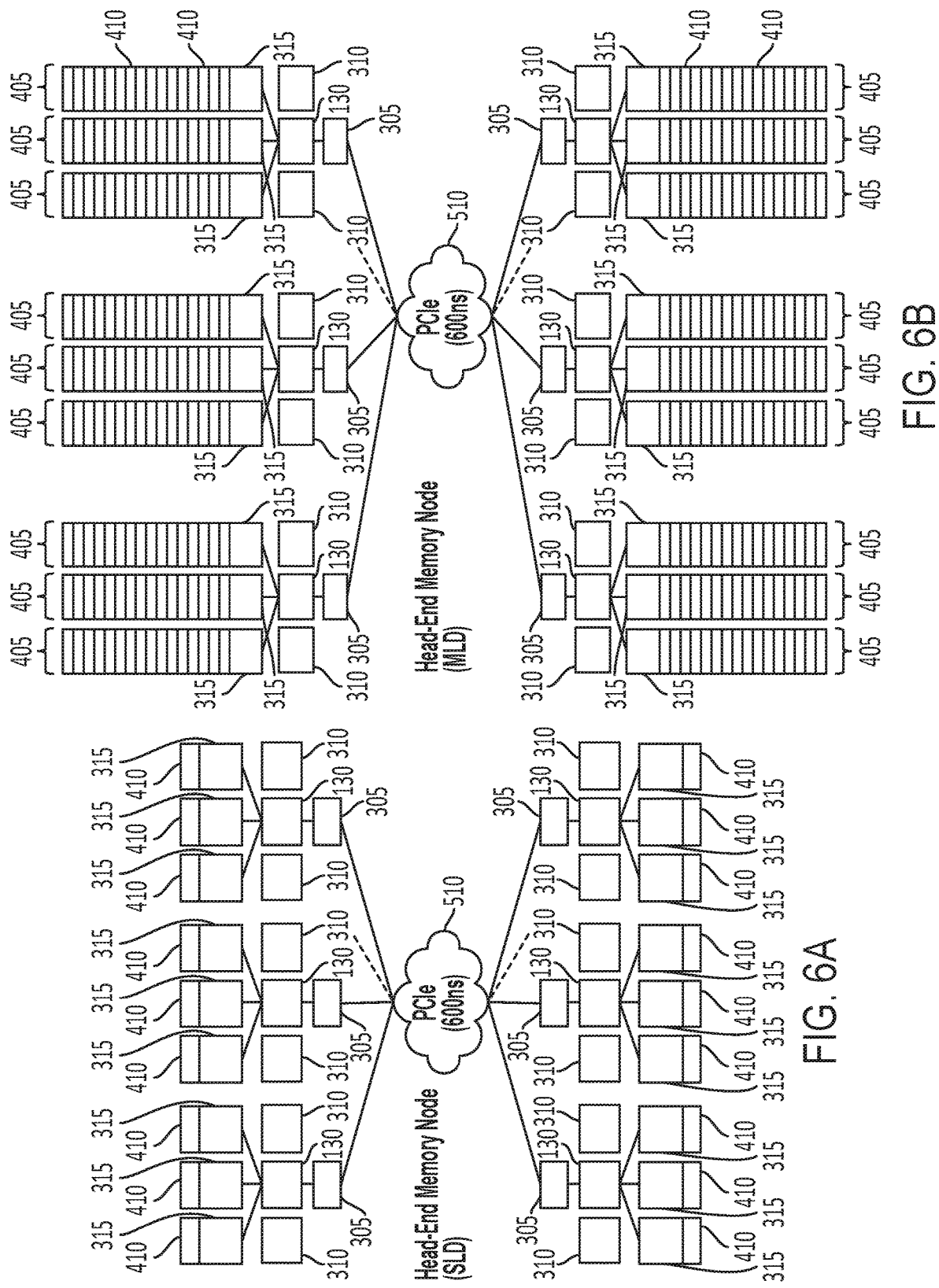

SCALABLE MEMORY POOL

CROSS-REFERENCE TO RELATED APPLICATION(S)

The present application claims priority to and the benefit of U.S. Provisional Application No. 63/419,643, filed Oct. 26, 2022, entitled "SCALABLE TIERED CXL MEMORY NODES POOLING ARCHITECTURE", the entire content of which is incorporated herein by reference.

FIELD

One or more aspects of embodiments according to the present disclosure relate to computing systems, and more particularly to a scalable memory pool.

BACKGROUND

Computing systems may run various applications, with different needs for memory. For example, some applications may require a relatively small amount of memory and other applications may require a larger amount. As another example, some applications may have performance requirements on the memory; for example, an application may require that the latency of memory it uses not exceed a certain amount. Some computing systems may include multiple hosts, sharing a memory pool.

It is with respect to this general technical environment that aspects of the present disclosure are related.

SUMMARY

According to an embodiment of the present disclosure, there is provided a system, including: a first memory node, including a first memory; a second memory node, including a second memory; and a memory node switching fabric connected to the first memory node and the second memory node, the memory node switching fabric being configured to provide access, via the first memory node: with a first latency, to the first memory, and with a second latency, greater than the first latency, to the second memory.

In some embodiments, the system further includes: a third memory node, including a third memory, wherein: the memory node switching fabric is further connected to the third memory node, and the memory node switching fabric is further configured to provide access, via the first memory node: with a third latency, greater than the second latency, to the third memory.

In some embodiments, the memory node switching fabric forms a hyper torus including a first dimension and a second dimension.

In some embodiments, the first memory node is a root memory node of the hyper torus.

In some embodiments, the second memory node is separated from the first memory node by one hop in the first dimension.

In some embodiments, the third memory node is separated from the first memory node by one hop in the first dimension and by one hop in the second dimension.

In some embodiments, the second memory node is connected to the first memory node by a COMPUTE EXPRESS LINK® (CXL®) connection.

In some embodiments, the first memory node includes a first computational processing circuit.

In some embodiments, the first memory node is configured to perform memory operations via remote direct memory access.

In some embodiments, the first computational processing circuit is a circuit selected from the group consisting of central processing units, graphics processing units, neural processing units, tensor processing units, application-specific integrated circuits, field programmable gate arrays, and combinations thereof.

In some embodiments, the first memory node further includes a second computational processing circuit co-packaged with the first computational processing circuit.

In some embodiments, the first memory includes a first memory module connected to the first computational processing circuit through a first COMPUTE EXPRESS LINK® (CXL®) connection.

In some embodiments, the first memory module is configured as a single logical device.

In some embodiments, the first memory module is configured as multiple logical devices.

In some embodiments, the first memory includes a second memory module connected to the first computational processing circuit through a second COMPUTE EXPRESS LINK® (CXL®) connection.

In some embodiments, the first memory node has an interface, for making a connection to a host, the interface being a COMPUTE EXPRESS LINK® (CXL®) interface.

According to an embodiment of the present disclosure, there is provided a system, including: a first memory node, including a first memory; a second memory node, including a second memory; and a memory node switching fabric connected to the first memory node and the second memory node, the memory node switching fabric forming a hyper torus including a first dimension and a second dimension and the memory node switching fabric being configured to provide access, via the first memory node: with a first latency, to the first memory, and with a second latency, greater than the first latency, to the second memory.

In some embodiments, the first memory node is a root node of the hyper torus.

In some embodiments, the second memory node is separated from the first memory node by one hop in the first dimension.

According to an embodiment of the present disclosure, there is provided a system, including: a first memory node, including a memory and a computational processing circuit; and a memory node switching fabric connected to the first memory node, the memory node switching fabric forming a hyper torus including a first dimension, a second dimension, and a third dimension.

BRIEF DESCRIPTION OF THE DRAWINGS

These and other features and advantages of the present disclosure will be appreciated and understood with reference to the specification, claims, and appended drawings wherein:

FIG. 3A is a block diagram of a memory node architecture, according to an embodiment of the present disclosure;

FIG. 3B is a block diagram of a memory node architecture, according to an embodiment of the present disclosure;

FIG. 3C is a block diagram of a memory node architecture, according to an embodiment of the present disclosure;

FIG. 3D is a block diagram of a memory node architecture, according to an embodiment of the present disclosure;

FIG. 3E is a block diagram of a memory node architecture, according to an embodiment of the present disclosure;

FIG. 6A is a block diagram of a memory pool architecture, according to an embodiment of the present disclosure;

FIG. 6B is a block diagram of a memory pool architecture, according to an embodiment of the present disclosure;

DETAILED DESCRIPTION

Figure 1A:
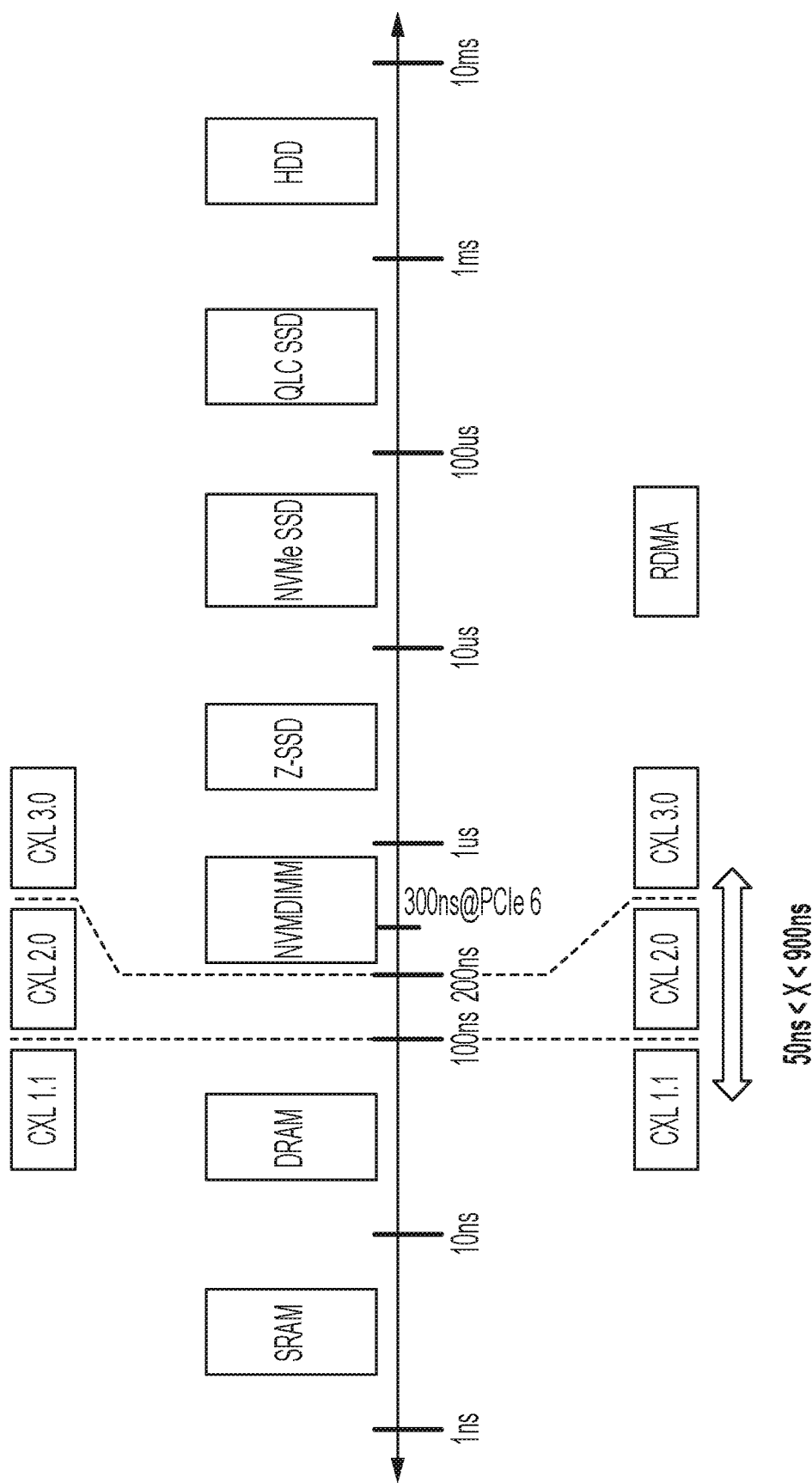
FIG. 1A is a latency diagram, according to an embodiment of the present disclosure.

The detailed description set forth below in connection with the appended drawings is intended as a description of exemplary embodiments of a scalable memory pool provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

As mentioned above, applications running on a host may have varying requirements for memory, in terms of quantity and performance characteristics. Moreover, in some computing systems, multiple hosts may be connected to a shared memory pool, and, in such a configuration, the requirements of each host (which may be based on the requirements of the applications running on the host) may differ, in terms of the quantity of memory needed, and the performance characteristics of the memory.

As such, in some embodiments, a scalable, disaggregated memory pool which enables latency management is constructed from a multi-dimensional array of memory nodes. Each memory node is connected to one or more other memory nodes with connections in one or more dimensions. The memory pool may have the characteristic that the number of hops required to reach a given memory node (and the corresponding latency) may depend on the location of the memory node in the multi-dimensional switching fabric that may be used to connect the memory nodes together. The multi-dimensional switching fabric may form a hyper torus. Such a memory pool may be part of a memory-centric computing system architecture (as distinct from some computing system architectures which may be considered to be processor-centric computing system architectures).

For example, a host may be directly connected to a memory node that may be referred to as a "root memory node", and the other memory nodes of the memory pool may be connected to the host through the root memory node (and, in some cases, through other intermediate memory nodes). An application that has the most stringent latency requirements may then request memory that is in the root memory node. An application that has somewhat less stringent latency requirements may request memory that is in the set of memory nodes that can be reached by one hop from the root memory node. Similarly, other applications with increasingly lenient latency requirements may use memory that is in memory nodes reachable from the root memory node by an increasingly large number of hops.

Each memory node may have, or lack, in respective different embodiments, a computational processing circuit, the presence of which may make it possible to access the data in the memory node using remote direct memory access (RDMA). Each memory node may be connected to the multi-dimensional switching fabric through a COMPUTE EXPRESS LINK® (CXL®) connection. Each memory node may include one or more memory modules. These memory modules may be connected together by CXL® connections. Each memory module may be configured as a CXL® single logical device (SLD) or as multiple logical devices (MLD).

FIG. 1, shows latencies for various types of memory and storage on a logarithmic scale, in which static random access memory (SRAM), for example, has a latency of about 3 ns, and a quad level cell (QLC) solid-state drive (SSD), for example, has a latency of about 300 ns. Various versions of CXL® have latencies in the range from 50 ns to 900 ns. As such, some embodiments may provide latencies in this range, or latencies that are multiples of values in this range (the multiple being related to the number of hops required to reach a memory node).

Figure 1B:
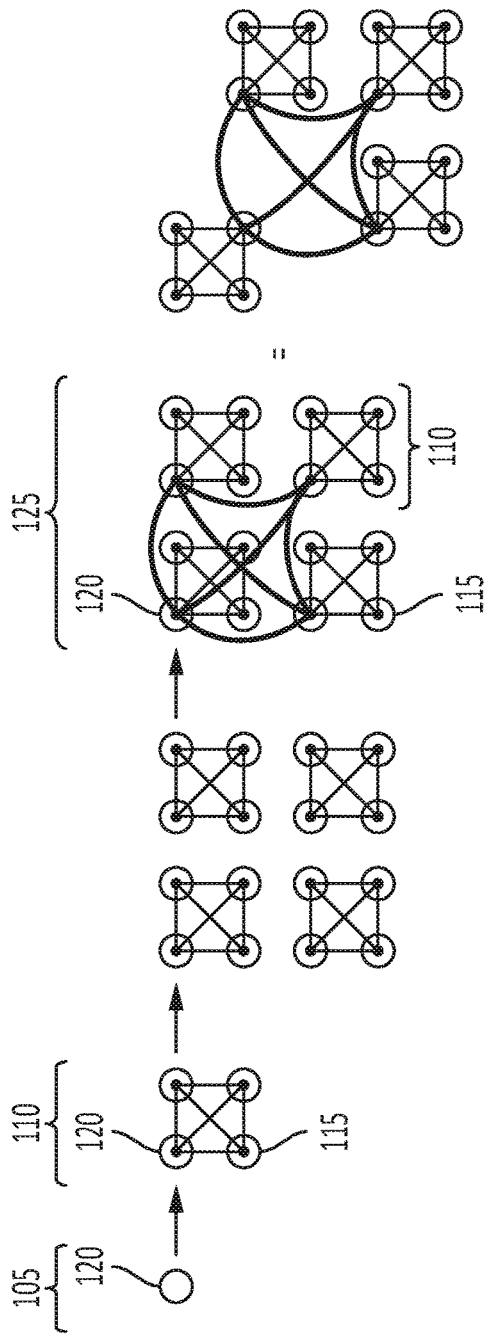
FIG. 1B is a schematic drawing of a node switching fabric, according to an embodiment of the present disclosure.
Figure 1C:
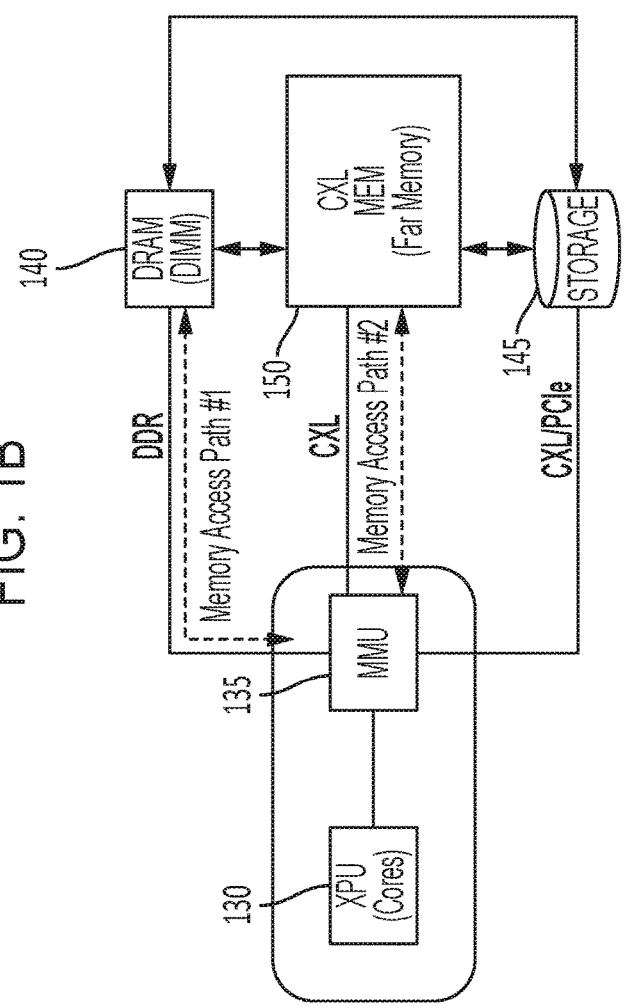
FIG. 1C is a block diagram of a portion of a computing system, according to an embodiment of the present disclosure.

FIG. 1B shows the progression of a series of memory pools of increasing dimension. A zero-dimensional memory pool 105 may consist of a single memory node 105, which may be a root memory node (discussed in further detail below). A memory pool in the form of a one-dimensional hyper torus 110 may include a fully-connected set (or "cell") of memory nodes 115 (e.g., four memory nodes 115, as shown), one of which may be a root memory node 120 (through which a host may form a connection to all of the memory nodes of the memory pool). A memory pool in the form of a two-dimensional hyper torus 125 may include a fully connected set of compound memory nodes (e.g., four compound memory nodes), each of the compound memory nodes being a one-dimensional hyper torus 110, the connections between the compound memory nodes being connections between their respective root memory nodes 120. The two-dimensional hyper torus 125 may have a root memory node 120 that is connected (i) by one hop to every other memory node of the one-dimensional hyper torus of which it is also the root memory node, (ii) by one hop to each other root memory node of a respective other one-dimensional hyper torus 110, and (iii) by two hops to each of the remaining memory nodes 115. The progression of FIG. 1B may be extended to construct a hyper torus with an arbitrarily large number of dimensions. As used herein, a "hyper torus" with dimension N and cell size M is a set of $M^N$ connected nodes that are fully connected along each of the N dimensions and that include a root node connected to M-1 other nodes in each of the N dimensions. The drawing to the right of the equals sign ("=") shows the two-dimensional hyper torus 125 drawn with one group of four nodes translated up and to the left, so that the connections between the translated group of nodes and the remaining nodes are more readily apparent. FIG. 1C shows a portion of a computing system including a computational processing circuit (XPU) 130 and a memory management unit (MMU) 135 connected to a host memory 140 (which may be dynamic random access memory (DRAM)) and persistent storage 145 (which may be, or include, a solid-state drive (SSD)). The DRAM and the SSD may have latencies of about 30 nanoseconds (ns) and 30 microseconds (us) respectively; the three-order-of-magnitude gap between these latency values may be effectively filled (or partially filled) by a memory pool 150 according to some embodiments.

Figure 2A:
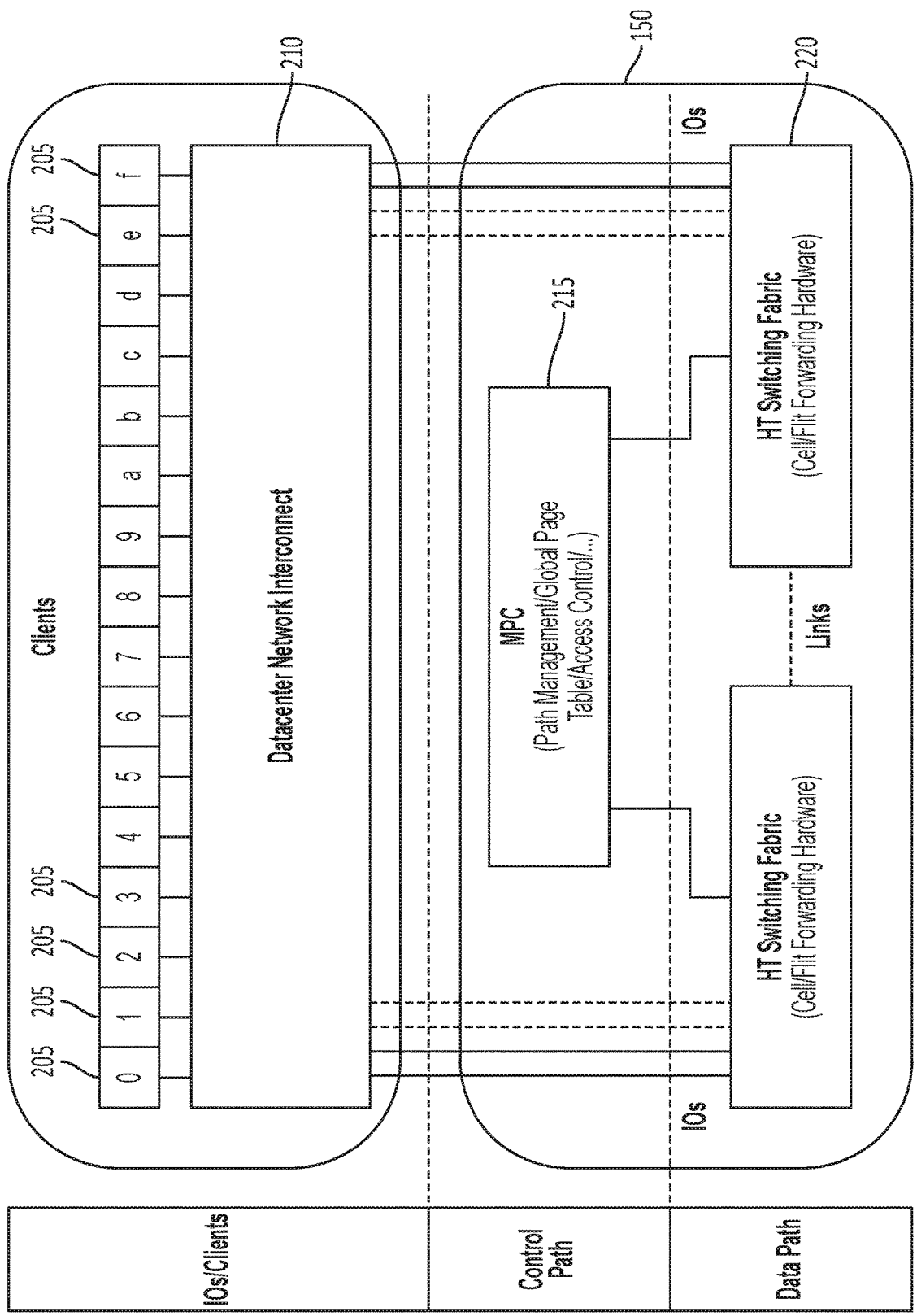
FIG. 2A is a block diagram of a system architecture, according to an embodiment of the present disclosure.
Figure 2B:
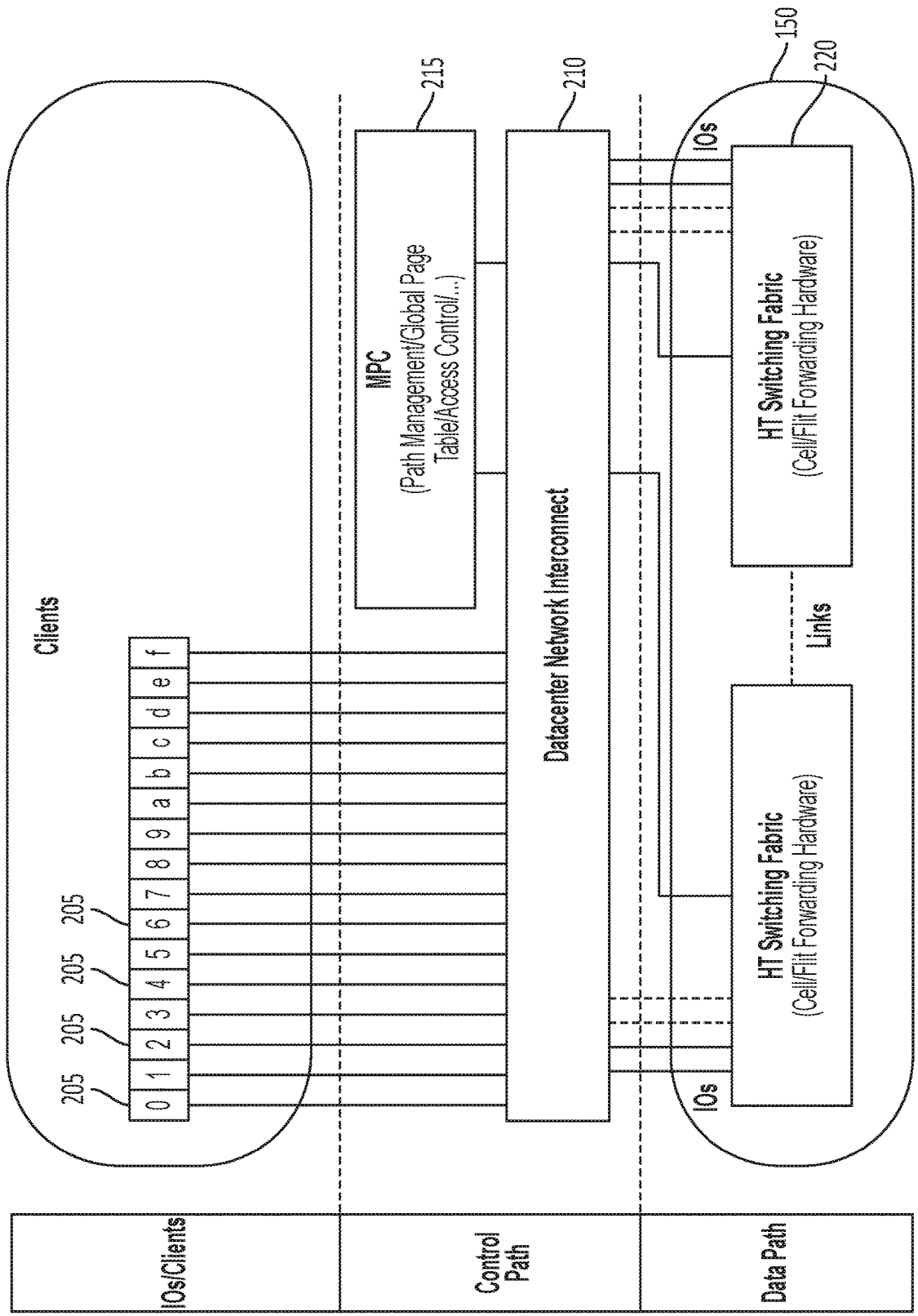
FIG. 2B is a block diagram of a system architecture, according to an embodiment of the present disclosure.
Figure 2C:
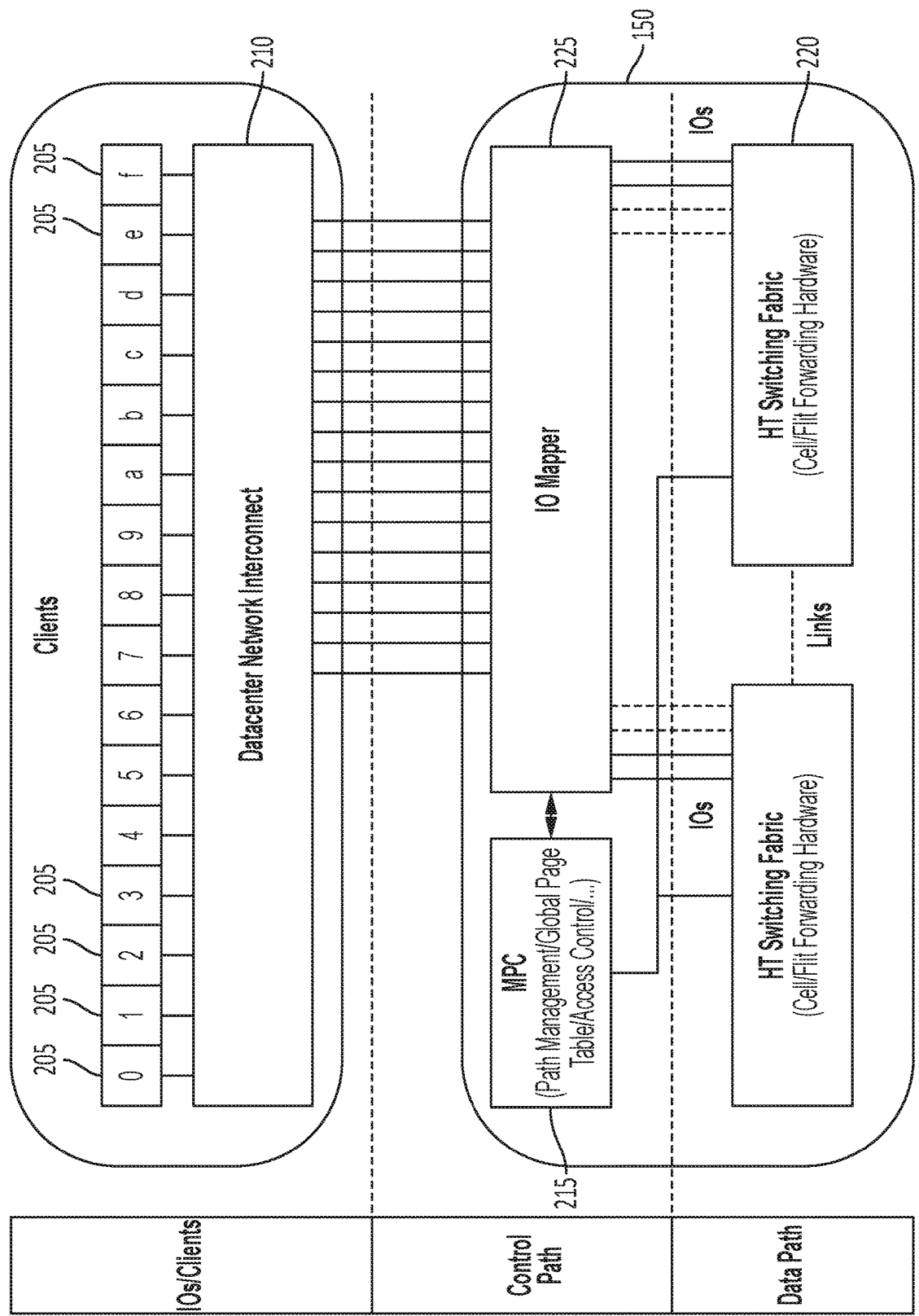
FIG. 2C is a block diagram of a system architecture, according to an embodiment of the present disclosure.

FIGS. 2A-2C show three architectures, in three respective embodiments. In the architecture of FIG. 2A, a plurality of clients 205 is connected, through a datacenter network interconnect 210, to the memory pool 150, which includes a memory pool controller 215 and a multi-dimensional switching fabric 220 (e.g., a hyper torus (HT) switching fabric) connecting together a plurality of memory nodes 115 (not separately illustrated in FIGS. 2A-2C). The multi-dimensional switching fabric 220 may forward flit-sized packets (64-byte packets), or "cell-sized" packets that are smaller than 64 bytes, to reduce the latency. The memory pool controller 215 may maintain a global page table and perform access control and path management (e.g., selecting between a hardware path and a software path, when data access is performed). The selecting may be performed based on the kind of workload, e.g., whether it is latency sensitive (e.g., artificial intelligence inference operations), with the fast path being, in some cases, more appropriate when the workload is latency sensitive.

In operation, when, e.g., a client 205 performs a read or write operation, the memory pool controller 215 may select the shortest path (the path having the fewest hops) through the multi-dimensional switching fabric. This selection may be based on topology information stored (e.g., programmed, when the multi-dimensional switching fabric is first constructed) in the memory pool controller 215. For example, the memory pool controller 215 may store a lookup table storing a suitable route for accessing each node.

The links between the clients 205 and the datacenter network interconnect 210 may be, for example, Ethernet links or INFINIBAND™ (IB™) links, or any other suitable (electrical, optical, or wireless) high speed links. The links between the datacenter network interconnect 210 and the multi-dimensional switching fabrics 220 may be CXL® links or Ethernet links, or any other suitable (electrical, optical, or wireless) high speed links. The links between the multi-dimensional switching fabrics 220 may be, for example, CXL® links or Ethernet links, or any other suitable (electrical, optical, or wireless) high speed links. The links between the memory pool controller 215 and the multi-dimensional switching fabrics 220 may be for example, CXL® links or Ethernet links, or any other suitable (electrical, optical, or wireless) high speed links.

The memory pool controller 215 may be a central control entity that manages the multi-dimensional switching fabric, such as dynamic capacity adjustment, alarms, or error and event handling. For example, when a page fault occurs, the CPU may process the page fault, and the memory pool controller 215 may select a slow (software library implemented) path or a fast (hardware implemented) path processing. A global page table may include (i) a page identifier (page ID) and (ii) an address range (e.g., a physical address range or a virtual address range), for each page in the memory of the memory pool 150. Global page table management may involve, due to the page fault processing, managing access control for implementing security features of the system.

The upper rounded rectangle shows inputs-outputs (IOs) or clients which may be the cloud service provider side of the system of FIG. 2A.

In the architecture of FIG. 2B, the memory pool controller 215 is connected to the memory pool 150 through the datacenter network interconnect 210. The architecture of FIG. 2B may exhibit the lowest latency of the three architectures illustrated in FIGS. 2A-2C. For example, in the embodiment of FIG. 2B, the datacenter network interconnect 210, which may be operated by a cloud service provider, is tightly integrated with the memory pool 150, which may be operated by a memory provider. In this configuration the memory pool controller 215 may have greater control over the datacenter network interconnect 210, allowing the memory pool controller 215 to achieve improved performance (e.g., lower latency).

Figure 7A:
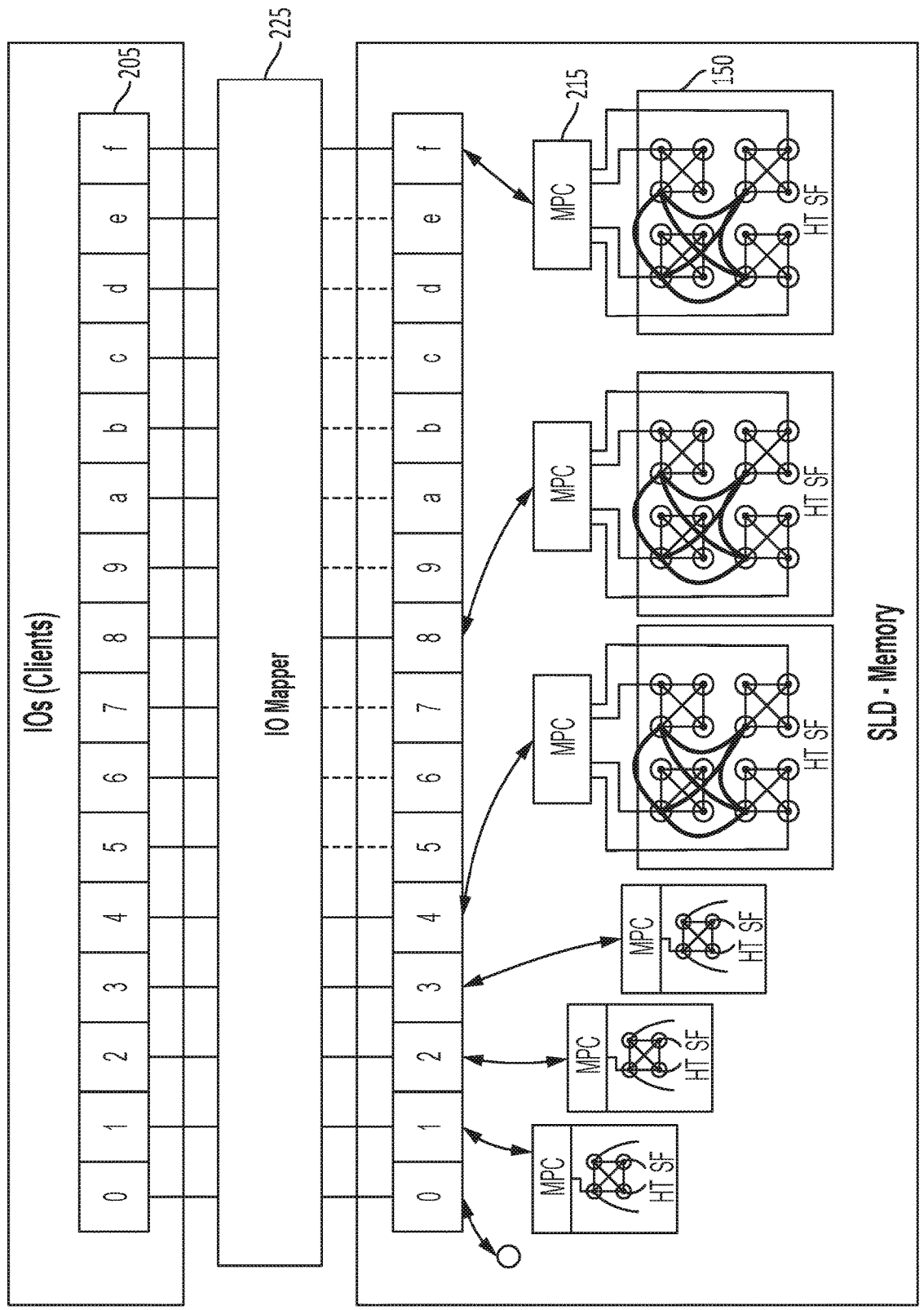
FIG. 7A is a block diagram of a system architecture, according to an embodiment of the present disclosure.

In the architecture of FIG. 7A, an input-output mapper 225 (IO mapper) 225 is connected between the datacenter network interconnect 210 and the memory pool 150. The input-output mapper 225 may include a many-to-one or one-to-many or many-to-many multiplexer and demultiplexer. Each of the clients 205 may be connected to the input-output mapper 225 through one or more serial data lanes (e.g., Peripheral Component Interconnect Express (PCIe) lanes), each lane contributing a certain amount of bandwidth (e.g., 0.25 gigabytes/second (GB/s), 0.5 GB/s, 1 GB/s, or 2 GB/s, depending on the version of PCIe used) to the total bandwidth of the connection to the input-output mapper 225. As such, some clients 205 may have connections, to the input-output mapper 225, with greater bandwidth than other clients 205. The input-output mapper 225 may be a configurable element that forms connections between the clients 205 and the memory pool 150, and that gives each client access, to the memory pool 150, with appropriate bandwidth (based on, e.g., the bandwidth of the connection at the client, or a service level to which the client 205 is entitled). In embodiments without an input-output mapper 225, a one-time static configuration may be employed between IOs (clients) and ports of the multi-dimensional switching fabrics 220. The input-output mapper 225 may provide a dynamic mapping configuration capability.

Each of FIGS. 3A-3E shows the structure of a memory node 115, in a respective embodiment. In FIG. 3A shows a head-end memory node, which includes a network interface circuit (NIC) 305, a computational processing circuit 130, node memory (e.g., DRAM memory) 310, and pool memory 315. The node memory 310 may, as mentioned above, include DRAM memory, which may be in a dual inline memory module (DIMM) package with a double data rate interface. In other embodiments, the node memory 310 includes high bandwidth memory (HBM). As used herein, a "computational processing circuit" is any stored-program computer circuit, e.g., a central processing unit, graphics processing unit, neural processing unit, or tensor processing unit, or a stored program computer implemented in an application-specific integrated circuit, or in a field programmable gate array. The node memory 310 may be used by the computational processing circuit 130, e.g., to store instructions executed by the computational processing circuit 130 or to store data used by the computational processing circuit 130. The pool memory 315 may be memory that contributes to the memory pool 150 and is used to store data for clients 205. The pool memory may be CXL® memory. It may be volatile or persistent memory (e.g., NAND flash memory or zNAND memory). In a head-end node, connections between the computational processing circuit 130 and the node memory 310 may be a double data rate (DDR) connection. The connection between the computational processing circuit 130 and the pool memory 315 may be PCIe/CXL®.io. The connection between the computational processing circuit 130 and the NIC 305 may be PCIe/CXL®.io or Ethernet. The embodiment of FIG. 3A may exhibit relatively low latency.

Each of the embodiments of FIGS. 3C, 3D, and 3E includes a cell switching fabric 320, which may include multiple switching fabrics interconnected through switching fabric links.

FIG. 3B shows a memory node structure similar to that of FIG. 3A except that the structure of FIG. 3B includes two co-packaged computational processing circuits 130 (which may be part of a composite computational processing circuit, e.g., each of the two computational processing circuits 130 may be installed in a respective socket of two closely spaced sockets in a substrate (e.g., in an organic printed circuit board substrate)). The co-packaged computational processing circuits 130 circuits may be configured to communicate directly with each other through a high-speed interface (such as Ultra Path Interconnect (UPI)). In some embodiments, more than two co-packaged computational processing circuits 130 are present, e.g., each in a respective socket. FIG. 3C shows a structure in which the pool memories 315 are connected together and to the computational processing circuits 130 by a cell switching fabric 320 (which may also be a multi-dimensional switching fabric, and which may have a latency of between 30 ns and 900 ns, e.g., less than 300 ns). Each of FIGS. 3A-3C shows a head-end memory node, referred to as a "head-end" memory node because it includes a computational processing circuit 130. Such memory nodes may be capable of providing data access through remote direct memory access. FIGS. 3D and 3E show structures of "headless" memory nodes, in some embodiments. The memory nodes may be referred to as headless because each of these memory nodes lacks a computational processing circuit 130. An input-output connector 325 (comprising a set of conductors) is used to form connections to other memory nodes within the multi-dimensional switching fabric 220. The structure of FIG. 3E lacks the node memory (e.g., DRAM memory) 310, which is present in FIG. 3D and which may be employed by the memory pool controller 215.

Figure 4A:
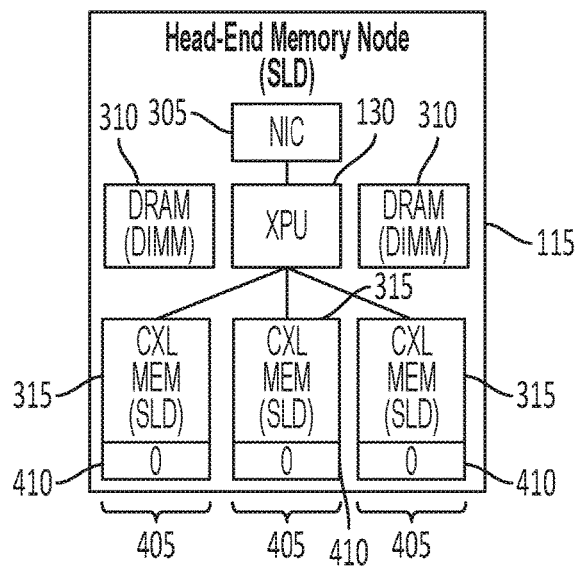
FIG. 4A is a block diagram of a memory node architecture, according to an embodiment of the present disclosure.
Figure 4B:
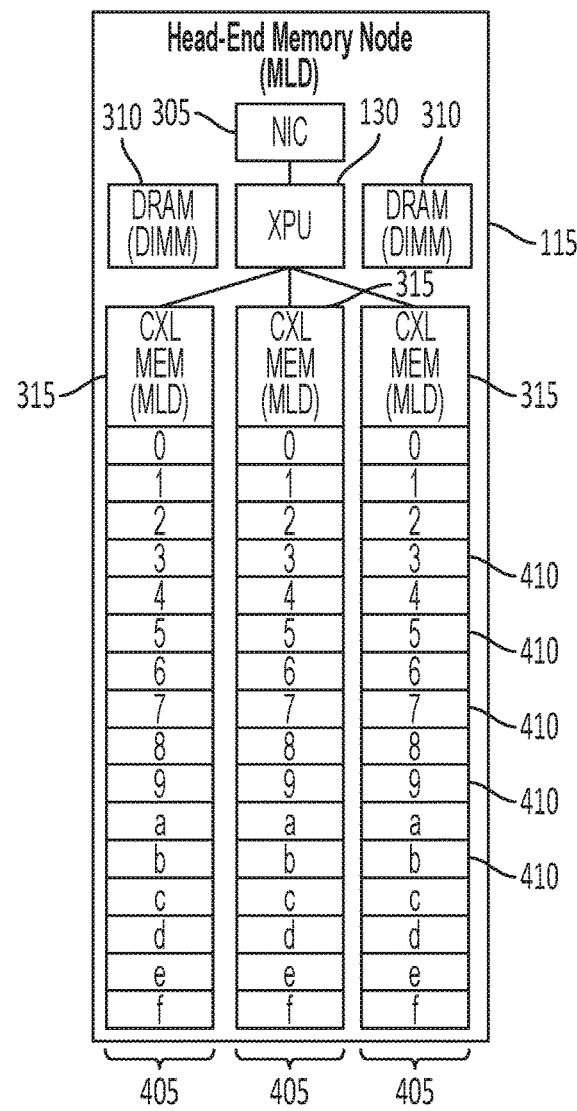
FIG. 4B is a block diagram of a memory node architecture, according to an embodiment of the present disclosure.

FIGS. 4A and 4B show two respective structures for head-end memory nodes 115. The structure of FIG. 4A includes a plurality of memory modules 405, each including pool memory 315 and each being configured as a single logical device. The structure of FIG. 4B includes a plurality of memory modules 405, each configured as multiple logical devices 410. Each of the multiple logical devices 410 may be assigned to a respective client 205.

Figure 5A:
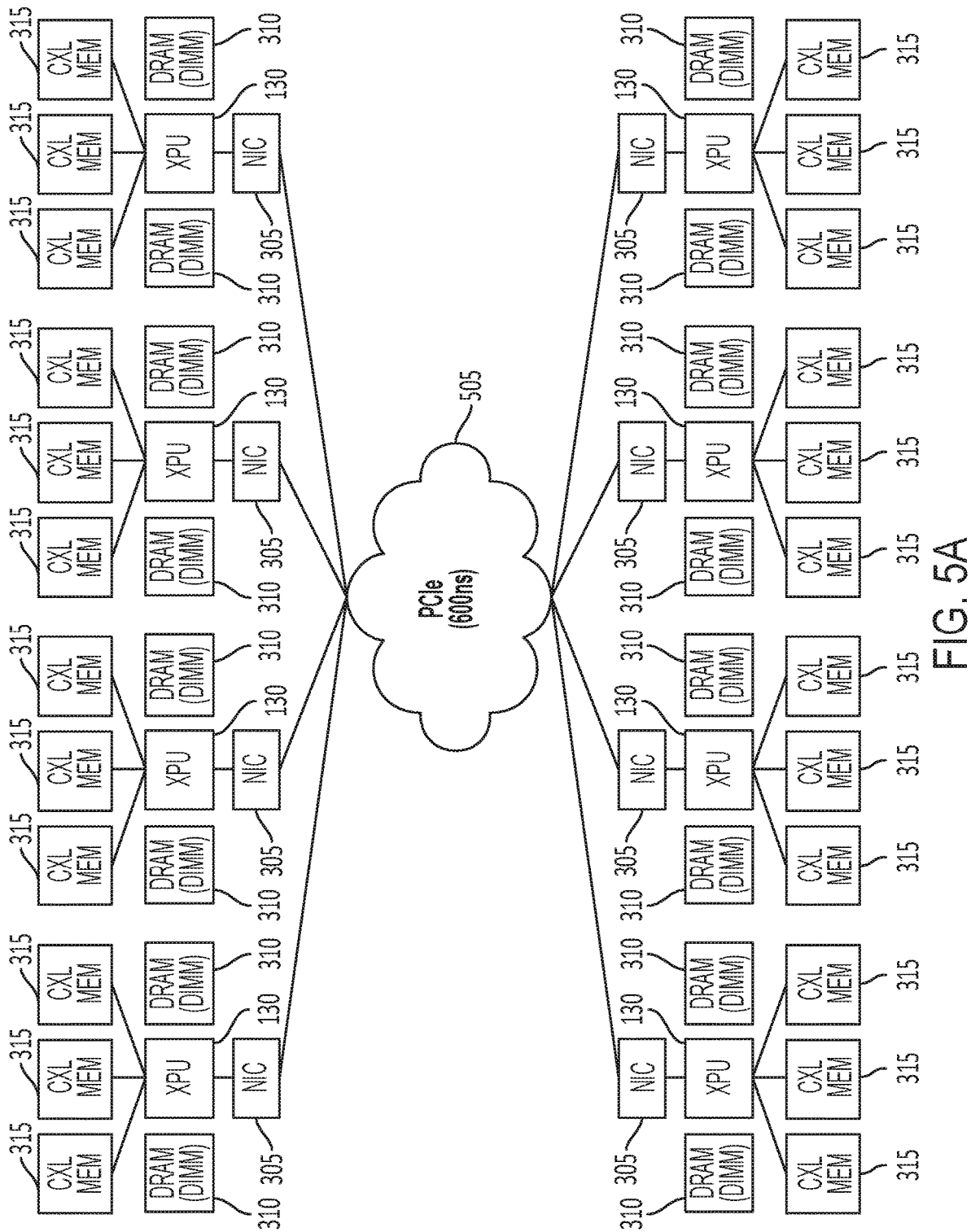
FIG. 5A is a block diagram of a memory pool architecture, according to an embodiment of the present disclosure.
Figure 5B:
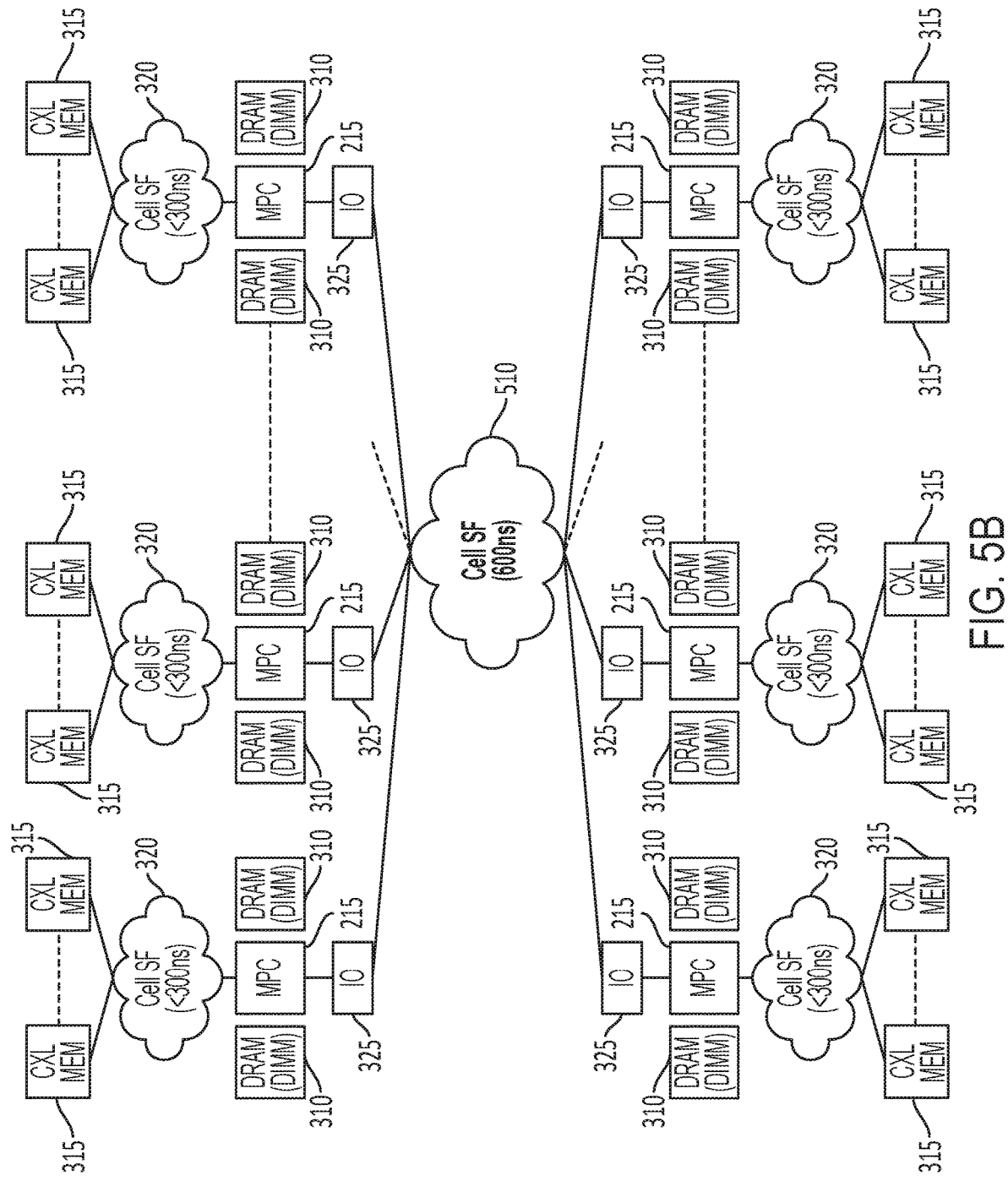
FIG. 5B is a block diagram of a memory pool architecture, according to an embodiment of the present disclosure.

FIG. 5A shows a scalable and latency manageable disaggregated CXL® memory resource pool architecture based on head-end memory nodes, with a PCI switch based interconnection fabric 505 (which need not be a the multi-dimensional (or hyper torus) switching fabric). In some embodiments, the interconnection fabric may be, e.g., INFINIBAND™. Such a protocol may incur additional latency for the protocol conversion. FIG. 5B shows a scalable and latency manageable disaggregated CXL® memory resource pool architecture based on head-less memory nodes and a multi-dimensional (e.g., hyper torus) switching fabric 510. The embodiment of FIG. 5A is an example of large-scale CXL® memory expansion with a cell-based switching fabric cluster. In this example, headless memory nodes are integrated with a cell-based switching fabric cluster that may exhibit lower latency than head-end memory nodes.

FIG. 6A shows a scalable and latency manageable disaggregated CXL® memory resource pool architecture in which each memory is configured as a single logical device. FIG. 6B shows a scalable and latency manageable disaggregated CXL® memory resource pool architectures in which each memory module is configured as multiple logical devices. In FIGS. 6A and 6B, PCIe (e.g., with a latency of about 600 ns) may be employed as the basis for the CXL® io protocol. Two approaches to the creation of a CXL® memory pool are illustrated. One approach (illustrated in FIG. 6A) employs SLD-based memory nodes (each having a single logical device) and the other approach (illustrated in FIG. 6B) employs MLD-based memory nodes (each having 16 logical devices). As such, with MLD large scale memory expansion may be performed and each logical device may have connections to multiple hosts or virtual machines (VMs).

Figure 7B:
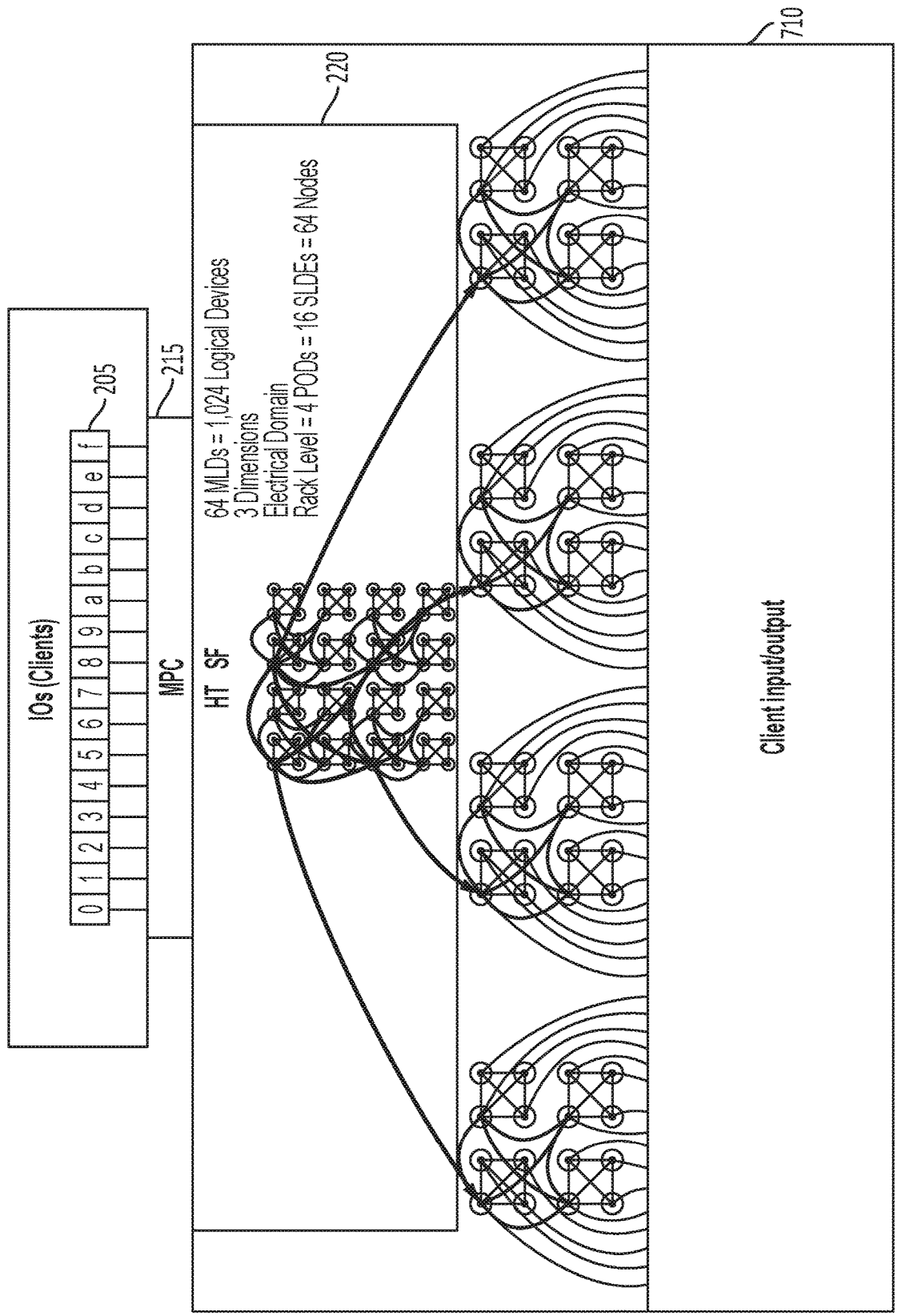
FIG. 7B is a block diagram of a system architecture, according to an embodiment of the present disclosure.

FIG. 7A shows an architecture in which several memory pools 150 are connected to the clients 205, through the input-output mapper 225. In some embodiments, the MPC 215 is integrated with the input-output mapper 225. The input-output mapper 225 may include a many-to-one or one-to-many or many-to-many multiplexer and demultiplexer, allowing it to form configurable connections between the clients and the input port of the memory pool 150. FIG. 7A illustrates the possibility of mapping each of several ports of the input-output mapper 225 to memory pools 150 of different dimensions (e.g., a zero-dimensional memory pool 150, a one-dimensional memory pool 150 or a two-dimensional memory pool 150). Dashed lines in FIG. 7A represent connections, between the input-output mapper 225 and its memory-side ports, that have not been configured. Each of the memory pools 150 includes a multi-dimensional switching fabric. The dimensionality of the multi-dimensional switching fabrics is not the same; as illustrated in FIG. 7A, some of the multi-dimensional switching fabrics are one-dimensional, and some are two-dimensional. FIG. 7B shows details of FIG. 5B, showing the hyper torus architecture. The set 710 of client input/outputs may include multiple (e.g., 16) logical devices per memory module 405 (e.g., 1024 logical devices if the memory pool 150 includes 64 memory modules 405). A system including a three-dimensional hyper torus switching fabric may include, in this switching fabric, up to 64 nodes. Hence, 64 CXL® memory nodes may be clustered together under three dimensions of a multi-dimensional switching fabric cluster. If a CXL® memory node is based on an MLD device which has 16 logical devices internally, then 64 such memory nodes (each node including an MLD-based memory node that has 16 logical devices internally), may include a total of 1,024 logical devices (where 1,024=64*16). In such a system, each of 1,024 virtual machines in a datacenter may have its own CXL® extended memory, within the multi-dimensional switching fabric cluster. If each logical memory device has a capacity of one terabyte (1 TB) or 2 TB, the total capacity of the memory pool may be 1 petabyte (PB) or 2 PB, in this example.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

It will be understood that when an element is referred to as being "immediately connected" or "immediately coupled" to another element, there are no intervening elements present. As used herein, "connected" means connected by a signal path (e.g., a conductor or a waveguide) that may contain arbitrary intervening elements, including intervening elements the presence of which qualitatively changes the behavior of the circuit. As used herein, "directly connected" means (i) "immediately connected" or (ii) connected with intervening elements, the intervening elements being ones (e.g., low-value resistors or inductors, short sections of transmission line, or short sections of waveguide) that do not qualitatively affect the behavior of the circuit.

Some embodiments may include features of the following numbered statements.

1. A system, comprising:
   a first memory node, comprising a first memory;
   a second memory node, comprising a second memory; and
   a memory node switching fabric connected to the first memory node and the second memory node, the memory node switching fabric being configured to
provide access, via the first memory node:
with a first latency, to the first memory, and
with a second latency, greater than the first latency, to
the second memory.

2. The system of statement 1, further comprising:
a third memory node, comprising a third memory,
wherein:
the memory node switching fabric is further connected
to the third memory node, and
the memory node switching fabric is further configured
to provide access, via the first memory node:
with a third latency, greater than the second latency, to
the third memory.

3. The system of statement 1 or statement 2, wherein the memory node switching fabric forms a hyper torus comprising a first dimension and a second dimension.

4. The system of statement 3, wherein the first memory node is a root memory node of the hyper torus.

5. The system of statement 3 or statement 4, wherein the second memory node is separated from the first memory node by one hop in the first dimension.

6. The system of any one of statements 3 to 5, wherein the third memory node is separated from the first memory node by one hop in the first dimension and by one hop in the second dimension.

7. The system of any one of statements 3 to 6, wherein the second memory node is connected to the first memory node by a Compute Express Link (CXL) connection.

8. The system of any one of the preceding statements, wherein the first memory node comprises a first computational processing circuit.

9. The system of any one of the preceding statements, wherein the first memory node is configured to perform memory operations via remote direct memory access.

10. The system of any one of the preceding statements, wherein the first computational processing circuit is a circuit selected from the group consisting of central processing units, graphics processing units, neural processing units, tensor processing units, application-specific integrated circuits, field programmable gate arrays, and combinations thereof.

11. The system of any one of the preceding statements, wherein the first memory node further comprises a second computational processing circuit co-packaged with the first computational processing circuit.

12. The system of any one of the preceding statements, wherein the first memory comprises a first memory module connected to the first computational processing circuit through a first Compute Express Link (CXL) connection.

13. The system of statement 12, wherein the first memory module is configured as a single logical device.

14. The system of statement 12, wherein the first memory module is configured as multiple logical devices.

15. The system of any one of statements 12 to 14, wherein the first memory comprises a second memory module connected to the first computational processing circuit through a second Compute Express Link (CXL) connection.

16. The system of any one of the preceding statements, wherein the first memory node has an interface, for making a connection to a host, the interface being a Compute Express Link (CXL) interface.

17. A system, comprising:
a first memory node, comprising a first memory;
a second memory node, comprising a second memory; and
a memory node switching fabric connected to the first memory node and the second memory node,
the memory node switching fabric forming a hyper torus comprising a first dimension and a second dimension and
the memory node switching fabric being configured to provide access, via the first memory node:
with a first latency, to the first memory, and
with a second latency, greater than the first latency, to the second memory.

18. The system of statement 17, wherein the first memory node is a root node of the hyper torus.

19. The system of statement 17 or statement 18, wherein the second memory node is separated from the first memory node by one hop in the first dimension.

20. A system, comprising:
a first memory node, comprising a memory and a computational processing circuit; and
a memory node switching fabric connected to the first memory node,
the memory node switching fabric forming a hyper torus comprising a first dimension, a second dimension, and a third dimension.

Although exemplary embodiments of a scalable memory pool have been specifically described and illustrated herein, many modifications and variations will be apparent to those skilled in the art. Accordingly, it is to be understood that a scalable memory pool constructed according to principles of this disclosure may be embodied other than as specifically described herein. The invention is also defined in the following claims, and equivalents thereof.

What is claimed is:

1. A system, comprising:
a first memory node, comprising a first memory;
a second memory node, comprising a second memory; and
a memory node switching fabric connected to the first memory node and the second memory node,
the memory node switching fabric being configured to:
provide access, via the first memory node, to the first memory in response to a first memory request associated with a first latency, and
provide access, via the first memory node, to the second memory in response to a second memory request associated with a second latency, greater than the first latency.

2. The system of claim 1, further comprising:
a third memory node, comprising a third memory,
wherein:
the memory node switching fabric is further connected to the third memory node, and
the memory node switching fabric is further configured to provide access, via the first memory node:
with a third latency, greater than the second latency, to the third memory.

3. The system of claim 2, wherein the memory node switching fabric forms a hyper torus, and the first memory node is a root memory node of the hyper torus.

4. The system of claim 3, wherein the second memory node is separated from the first memory node by one hop in a first dimension of the hyper torus.

5. The system of claim 4, wherein the third memory node is separated from the first memory node by one hop in the first dimension of the hyper torus and by one hop in a second dimension of the hyper torus.

6. The system of claim 1, wherein the first memory node comprises a first computational processing circuit.

7. The system of claim 6, wherein the first memory node is configured to perform memory operations via remote direct memory access.

8. The system of claim 6, wherein the first computational processing circuit is a circuit selected from the group consisting of central processing units, graphics processing units, neural processing units, tensor processing units, application-specific integrated circuits, field programmable gate arrays, and combinations thereof.

9. The system of claim 6, wherein the first memory node further comprises a second computational processing circuit co-packaged with the first computational processing circuit.

10. The system of claim 6, wherein the first memory comprises a first memory module, and the first memory module is configured as a single logical device.

11. The system of claim 6, wherein the first memory comprises a first memory module, and the first memory module is configured as multiple logical devices.

12. A system, comprising:
a first memory node, comprising a first memory;
a second memory node, comprising a second memory; and
a memory node switching fabric connected to the first memory node and the second memory node,
the memory node switching fabric forming a hyper torus comprising three or more dimensions, and
the memory node switching fabric being configured to:
provide access, via the first memory node, to the first memory in response to a first memory request associated with a first latency, and
provide access, via the first memory node, to the second memory in response to a second memory request associated with a second latency, greater than the first latency.

13. The system of claim 12, wherein the first memory node is a root node of the hyper torus.

14. The system of claim 13, wherein the second memory node is separated from the first memory node by one hop in a first dimension of the three or more dimensions.

15. A system, comprising:
a first memory node, comprising a memory and a computational processing circuit;
a second memory node, comprising a second memory; and
a memory node switching fabric connected to the first memory node and the second memory node,
the memory node switching fabric forming a hyper torus comprising a first dimension and a second dimension, and
the memory node switching fabric being configured to:
provide access, via the first memory node, to the memory in response to a first memory request associated with a first latency, and
provide access, via the first memory node, to the second memory in response to a second memory request associated with a second latency, greater than the first latency.

* * * * *